United States Patent
Nerone et al.

(10) Patent No.: US 6,443,769 B1
(45) Date of Patent: Sep. 3, 2002

(54) LAMP ELECTRONIC END CAP FOR INTEGRAL LAMP

(75) Inventors: Louis R. Nerone, Brecksville; Joseph C. Oberle, Chagrin Falls, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/784,668

(22) Filed: Feb. 15, 2001

(51) Int. Cl.[7] .................................................. H01K 1/00
(52) U.S. Cl. .................................... 439/612; 313/51
(58) Field of Search .................................. 439/612, 226, 439/236, 620; 313/318.01, 51; 315/61, 78

(56) References Cited

U.S. PATENT DOCUMENTS

| | | |
|---|---|---|
| 2,295,657 A | 9/1942 | Hodgkins |
| 2,351,305 A | 6/1944 | Thayer |
| 3,549,941 A | 12/1970 | Friedmann |
| 3,753,071 A | 8/1973 | Engel et al. |
| 3,996,493 A | 12/1976 | Davenport et al. |
| 4,042,819 A | 8/1977 | Dacal |
| 4,092,562 A | 5/1978 | Campbell |
| 4,109,307 A | 8/1978 | Knoll |
| 4,204,139 A | 5/1980 | Shimer et al. |
| 4,259,614 A | 3/1981 | Kohler |
| 4,268,780 A | 5/1981 | Roche et a. |
| 4,275,325 A * | 6/1981 | Guim ........................ 313/51 |
| 4,293,799 A | 10/1981 | Roberts |
| 4,316,121 A | 2/1982 | Hammer et al. |
| 4,353,007 A | 10/1982 | Moerkens et al. |
| 4,508,996 A | 4/1985 | Clegg et al. |
| 4,571,526 A | 2/1986 | Wesselink |
| 4,740,873 A | 4/1988 | Blake |
| 4,751,435 A | 6/1988 | Roche et al. |
| 4,792,726 A | 12/1988 | Gandhi |
| 4,857,806 A | 8/1989 | Nilssen |
| 4,939,420 A | 7/1990 | Lim |
| 5,047,696 A | 9/1991 | Nilssen |
| 5,189,339 A | 2/1993 | Peshak |
| 5,208,511 A | 5/1993 | Garbowicz |
| 5,294,865 A | 3/1994 | Haraden |
| 5,331,253 A | 7/1994 | Counts |
| 5,341,068 A | 8/1994 | Nerone |
| 5,406,177 A | 4/1995 | Nerone |
| 5,485,057 A | 1/1996 | Smallwood et al. |
| 5,529,522 A * | 6/1996 | Huang ........................ 439/440 |
| 5,541,477 A | 7/1996 | Maya et al. |
| 5,654,609 A | 8/1997 | Smallwood et al. |
| 5,710,487 A | 1/1998 | Valcke |
| 5,712,526 A | 1/1998 | Fulop et al. |
| 5,720,546 A | 2/1998 | Correll, Jr. et al. |
| 5,796,214 A | 8/1998 | Nerone |
| 5,907,218 A | 5/1999 | Altman et al. |
| 5,952,790 A | 9/1999 | Nerone et al. |
| 5,965,985 A | 10/1999 | Nerone |
| RE36,414 E | 11/1999 | Tickner |
| 6,018,220 A | 1/2000 | Nerone |
| 6,078,143 A | 6/2000 | Nerone |
| 6,193,534 B1 * | 2/2001 | Burwell et al. ............. 439/226 |
| 6,250,970 B1 * | 6/2001 | Key et al. ................. 439/699.2 |

FOREIGN PATENT DOCUMENTS

| | | |
|---|---|---|
| DE | 195 12 307 | 2/1996 |
| DE | WO96/31996 | 10/1996 |
| GB | 1 401 628 | 7/1975 |
| WO | WO91/16802 | 10/1991 |

* cited by examiner

Primary Examiner—Brian Sircus
Assistant Examiner—Chandrika Prasad
(74) Attorney, Agent, or Firm—Fay, Sharpe, Fagan, Minnich & McKee, LLP

(57) ABSTRACT

A lamp/lamp electronics unit 12 includes a lamp and a lamp electronics end cap configuration. The lamp electronics end cap configuration 36 includes a lamp electronics end cap 37 having an interior section and a set of pins 44,45 extending from a surface of the end cap 37. Lamp electronics 22 are configured to control operation of the integral lamp, and are located within the interior of the lamp electronics end cap 37. At least one electrical connection 50 exists between the lamp electronics end cap 37 and the lamp electronics 22.

20 Claims, 5 Drawing Sheets

LAMP ELECTRONIC END CAP FOR INTEGRAL LAMP

BACKGROUND OF THE INVENTION

The present invention is directed to a lamp/lamp electronics unit, and more particularly to the formation and configuration of a lamp electronics end cap of the lamp/lamp electronics unit.

SUMMARY OF THE INVENTION

A lamp/lamp electronics unit includes a lamp and a lamp electronics end cap configuration. The lamp electronics end cap configuration includes a lamp electronics end cap having an interior section and a set of pins extending from a surface of the end cap. Lamp electronics are configured to control operation of the integral lamp, and are located within the interior of the lamp electronics end cap. At least one electrical connection exists between the lamp electronics end cap and the lamp electronics.

DETAILED DESCRIPTION OF THE PREFERRED EMBODIMENTS

Figure 1:
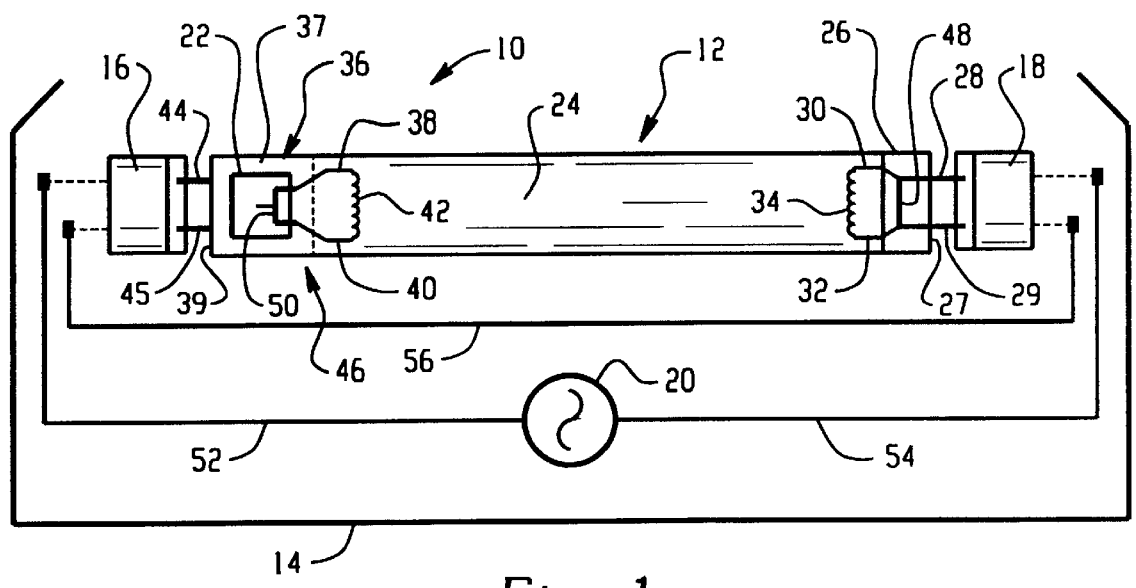
FIG. 1 is directed to a lamp lighting system which may incorporate the concepts of the present invention.

FIG. 1 is a lighting system 10 in which the present invention may be implemented. System 10 includes lamp/lamp electronics unit 12, fixture or housing 14, and lamp connectors 16,18 powered by power source 20. Lamp/lamp electronics unit 12 is comprised of lamp electronics 22 and a lamp 24, such as a linear fluorescent lamp, formed as the single lamp/lamp electronics unit 12, connected within lamp housing 14.

Lamp 24 further includes an end cap 26, with a surface 27 from which extend pins 28, 29. Connection between lamp 24 and end cap 26 may be made by connecting electrical terminals 30, 32 of filament 34 to pins 28, 29. At the opposite end, a lamp electronics end cap configuration 36 includes a lamp electronics end cap 37 having an interior which holds lamp electronics 22. The lamp electronics end cap configuration 36 is connected to lamp 24 by terminals 38, 40 of filament 42. Lamp electronics end cap configuration 36 also has pins or connectors 44, 45 extending from an outer surface 39. The lamp electronics cap configuration 36 and lamp 24 are integrally connected. Pins or connectors 28, 29 and 44, 45 are respectively inserted within lamp connectors 16, 18 in a manner known in the art. Such connectors may be tombstone connectors or other connectors well known in the art. In this embodiment, terminals 30 and 32 are shorted together by line 48 and terminals 38 and 40 are shorted together and connected to lamp electronics 22 by line 50. In an alternative embodiment, terminals 30, 32 are not shorted together.

In lighting system 10, the attachment of power lines 52, 54 and connection line 56 are made such that upon removal of unit 12, lines 52, 54 and 56 are maintained within the housing 14. Thus, unit 12 can be removed alone without the need of also removing any one of lines 52, 54, or 56.

Neither an external or internal conductor wire extends along the length of lamp 24 from the integrated end of lamp electronics 22 and lamp 24 to the opposite end of lamp 24. Rather, and as will be explained in more detail within this document, the wiring connection within housing 14 connects to end connectors 16, 18 in such a manner that a complete electrical path is provided to operate the lamp/lamp electronics unit 12. Thus, by use of the design in FIG. 1 a user is able to easily remove lamp electronics 22 and lamp 24 as single unit 12, thereby increasing the ease with which no longer functioning units are replaced.

Figure 2:
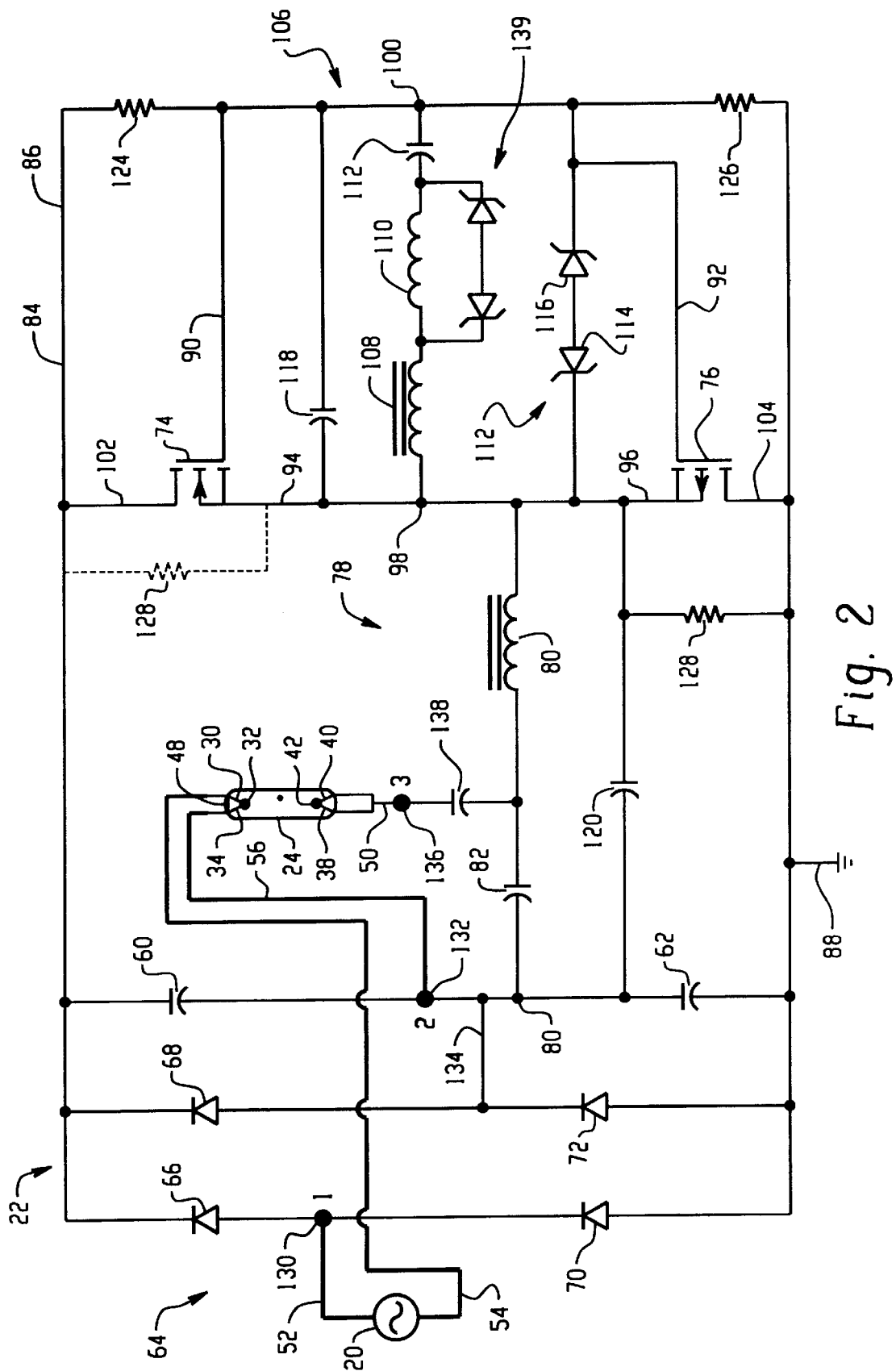
FIG. 2 sets forth a more detailed schematic of the lamp electronics in accordance with the circuit of FIG. 1.

Turning to FIG. 2, illustrated is a detailed schematic of one embodiment for the wiring and connections of lighting system 10 of FIG. 1. In this circuit power source 20 is configured to supply lamp electronics 22, which in turn controls operation of lamp 24. Lamp electronics 22 and lamp 24 are configured such that they are a single integral unit.

In FIG. 2 lamp electronics 22 include a non-electrolytic capacitor configuration 60, 62. Power source 20, which may be an a.c. source, supplies current to an a.c.-to-d.c. rectifier, which may be a full-wave bridge rectifier 64, formed by diodes 66, 68, 70, 72.

Switches 74 and 76 are respectively controlled to convert d.c. current from rectifier 64 to a.c. current received by resonant load circuit 78, comprising resonant inductor 80 and resonant capacitor 82. D.c. bus voltage 84, exists between bus conductor 86 and reference conductor 88, shown for convenience as a ground. Resonant load circuit 78 also includes lamp 24.

In this circuit, switches 74 and 76 are complementary to each other in the sense, for instance, that switch 74 may be an n-channel enhancement mode device as shown, and switch 76 may be a p-channel enhancement mode device as shown. These are known forms of MOSFET switches, but Bipolar Junction Transistor switches could also be used, for instance. Each switch 74 and 76 has a respective gate, or control terminal, 90 or 92. The voltage from gate 90 to source 94 of switch 74 controls the conduction state of that switch. Similarly, the voltage from gate 92 to source 96 of switch 76 controls the conduction state of that switch. As shown, sources 94 and 96 are connected together at a common node 98. With gates 90 and 92 interconnected at a common control node 100, the single voltage between control node 100 and common node 98 controls the conduction states of both switches 74 and 76. The drains 102 and 104 of the switches are connected to bus conductor 86 and reference conductor 88, respectively.

Gate drive circuit 106, connected between control node 100 and common node 98, controls the conduction states of switches 74 and 76. Gate drive circuit 106 includes a driving inductor 108 that is mutually coupled to resonant inductor 80 and is connected at one end to common node 98. The end of inductor 80 connected to node 98 may be a tap from transformer winding forming inductors 80 and 108. Driving inductor 108 provides the driving energy for operation of gate drive circuit 106. A second inductor 110 is serially connected to driving inductor 108. As will be further explained below, second inductor 110 is used to adjust the phase angle of the gate-to-source voltage appearing between nodes 98 and 100. A bidirectional voltage clamp 112 including diodes 114, 116 between nodes 98 and 100 clamps positive and negative excursions of gate-to-source voltage to respective limits determined, e.g., by the voltage ratings of the back-to-back Zener diodes shown. A capacitor 118 is preferably provided between nodes 98 and 100 to predictably limit the rate of change of gate-to-source voltage between nodes 98 and 100. This beneficially assures, for instance, a dead time interval in the switching modes of switches 74 and 76 wherein both switches are off between the times of either switch being turned on. An optional snubbing capacitor 120 is also provided.

Beneficially, the use of gate drive circuit 106 results in the phase angle between the fundamental frequency component of the resonant voltage and the current in resonant load circuit 78 to be approaching 0° during ignition of the lamp. Angular frequency $\omega_R$ is the frequency of resonance of resonant load circuit 78. At resonance, lamp voltage is at its highest value. It is desirable for the lamp voltage to approach such a resonant point during lamp ignition. This is because the very high voltage spike generated across the lamp at such point reliably initiates an arc discharge in the lamp, causing it to start. In contrast, during steady state operation, the lamp operates at a considerably lower voltage, at a higher angular frequency $\omega_{SS}$. Now referring to the phase angle between the fundamental frequency component of resonant voltage and the current in resonant load circuit 78, this phase angle tends to migrate towards 0° during lamp ignition. In turn, lamp voltage migrates towards the high resonant voltage, which is desirable, as explained, for reliably starting the lamp.

With continuing attention to FIG. 2, the circuit also includes a coupling capacitor 122, connected between node 100 and inductor 110 that becomes initially charged, upon energizing of rectifier 64, via resistors 124, 126 and 128. At this instant, the voltage across capacitor 122 is zero, and during the starting process, serial-connected inductors 108 and 110 act essentially as a short circuit, due to the relatively long time constant for charging capacitor 122. With resistors 124, 126, 128 being of equal value, for instance, the voltage on node 98, upon initial bus energizing, is approximately ⅓ of bus voltage 84, while the voltage at node 100 between resistors 124 and 126 is ½ of bus voltage 84. In this manner, capacitor 122 becomes increasingly charged, from left to right, until it reaches the threshold voltage of the gate-to-source voltage of upper switch (e.g., 2–3 volts) 74. At this point, upper switch 74, switches into its conduction mode, which then results in current being supplied by switch 74 to resonant load circuit 78. In turn, the resulting current in the resonant load circuit causes regenerative control of first and second switches 74 and 76 in the manner previously described.

During steady state operation of lamp electronics 22, the voltage of common node 98, between switches 74 and 76, becomes approximately ½ of bus voltage 84. The voltage at node 100 also becomes approximately ½ bus voltage 84, so that capacitor 122 cannot again, during steady state operation, become charged so as to again create a starting pulse for turning on switch 74. During steady state operation, the capacitive reactance of capacitor 122 is much smaller than the inductive reactance of driving inductor 108 and inductor 110, so that capacitor 122 does not interfere with operation of those inductors.

Resistor 128 may be alternatively placed as shown in broken lines, for shunting upper switch 74, rather than lower switch 76. The operation of the circuit is similar to that described above with respect to resistor 128 shunting lower switch 76. However, initially, common node 98 assumes a higher potential than node 100 between resistors 124 and 126, so that capacitor 122 becomes charged from right to left. The results in an increasingly negative voltage between node 98 and node 100, which is effective for turning on lower switch 76.

Resistors 124 and 126 are both preferably used in the circuit of FIG. 2; however, the circuit will function substantially as intended with resistor 126 removed and using resistor 128 as shown in solid lines. The use of both resistors 124 and 126 may result in a quicker start at a somewhat lower line voltage. The circuit will also function substantially as intended with resistor 124 removed and using resistor 128 as shown in dashed lines. Additionally, resistors 124, 126 and 128 are non-critical value components, which may be 100 k ohms or 1 megohm each, for example. Preferably such resistors have similar values, e.g., approximately equal.

A typical prior art circuit employs a voltage-breakover device, such as a diac for starting regenerative operation of gate control circuitry for the converter switches. Such devices typically have a voltage-breakover threshold requiring, for instance, 150 volts of bus voltage to fire.

Since lamp electronics circuit 22 of FIG. 2 does not use a voltage-breakover device for starting regenerative operation of its gate control circuitry, the circuit can start at a relatively lower d.c. bus voltage of, for instance, 10 volts. This considerably reduces the time intervals during which averaged a.c. currents are zero, directly resulting in a high power factor for a.c. current supplied by the a.c. source. Further, the averaged a.c. currents are more centered in their respective half cycles; which increases power factor. An economical circuit can readily obtain a power factor of at least about 0.85, and, more preferably, at least about 0.9.

With a.c. current being much more continuously supplied to lamp electronics circuit 22, smoothing capacitor configuration 60, 62 needs to store a much reduced amount of energy compared to a typical lamp electronic circuit. As such, smoothing capacitor configuration 60, 62 is realized by a dry-type (i.e. non-electrolytic as defined above) capacitor configuration having a much reduced value from a typical electrolytic capacitor. Since wearing out of an electrolytic capacitor is a typical limiting factor in a ballast circuit of the type described herein, e.g., after 10,000 hours of use, replacing it with a dry-type capacitor substantially increases lifetime of the circuit. Additionally, the circuit can operate from very low d.c. voltages with its converter switches turning on and off with negligible voltage across them, i.e., with soft switching, to minimize deleterious switch heating.

With continuing attention to FIG. 2, power line connection 52 from power source 20 is used as a direct connection point to lamp electronics 22 at center point 130 (node 1) between diodes 66 and 70. Thus, power line 52 is placed directly between two diodes of full bridge rectifier 64. Second power line 54 from power source 20 is connected to a first end or terminal 30 of filament 32. The second end or terminal 34 of filament 32 is connected to connection wire 56 which is connected to center point 132 (node 2) between capacitors 60, 62. A connecting wire 134 connects the center point 132 to diodes 68 and 70 of full bridge rectifier 64. This configuration results in the power source 20 being directly connected to the lamp electronics 22. In this circuit, filament 32 is shorted, by line 48.

The second side of lamp 24 has a first end or terminal 38 and a second end or terminal 40 of filament 42 shorted together by line 50. The shorted terminals are connected together at connection point 136 (node 3) to capacitor 138.

By this connection scheme terminals 38 and 40 are connected to resonant inductor 80 and resonant capacitor 82, through capacitor 138. As an additional aspect or embodiment to the foregoing, terminals 30 and 32 may be shorted by optional line 48. A providing line 48 improvement of overall system efficiency may be obtained by limiting cathode losses. The shorting of terminals 30, 32 in 38, 42 is preferably undertaken internally within the lamp electronics end cap 36 holding the lamp electronics 22. Using this design, when unit 12 is removed from lamp connectors 16, 18 (FIG. 1), the connection is also removed from the system. From the foregoing it can be seen that the present embodiment teaches a three terminal (node) lamp network as opposed to prior art systems that employ a four-terminal (node) network.

In conventional lighting systems, terminal 32 would not be connected to center point 132. In other words, connecting line 56 would not exist. Further, power line 54 would not connect terminal 30 to the power source 20. Rather, the power source would be directly connected between diodes 68, 72. In existing instant start systems, terminals 38 and 40 may be connected together in order to short the cathode, and would be connected to an output within its lamp electronics. Therefore, conventional lamp systems have two dedicated inputs and two dedicated outputs. However, in the present embodiment, there is a single dedicated input 130 (node 1); a dual-function input/output 132 (node 2); and a single dedicated output 136 (node 3). This connection scheme eliminates the need for a conductor wire to be provided along side or inside the lamp. Rather, in the present embodiment the connecting wire to the opposite side of the lamp is run within the fixture. The reason it is possible to run this wire within the fixture, and not directly connected to the lamp electronics, is because it is connected to one side of the power line. The lamp electronics output and input are now one connection. This means that the pin which goes to the input of lamp power source 20 serves as an input and an output (line 54).

Use of the non-electrolytic capacitors 60 and 62 provides a high-power factor for starting of the linear lamp 24. Non-electrolytic capacitors 60 and 62 are small in size which is beneficial to providing a high power factor. However, due to this small size, they have a tendency to quickly enter a discharge state at times when they are not being charged.

A voltage clamp 139 consisting of two back-to-back zener diodes, is placed across inductor 110. Voltage clamp 139 provides a clamping function on voltage which is to be impressed on switches 74, 76.

Figure 3:
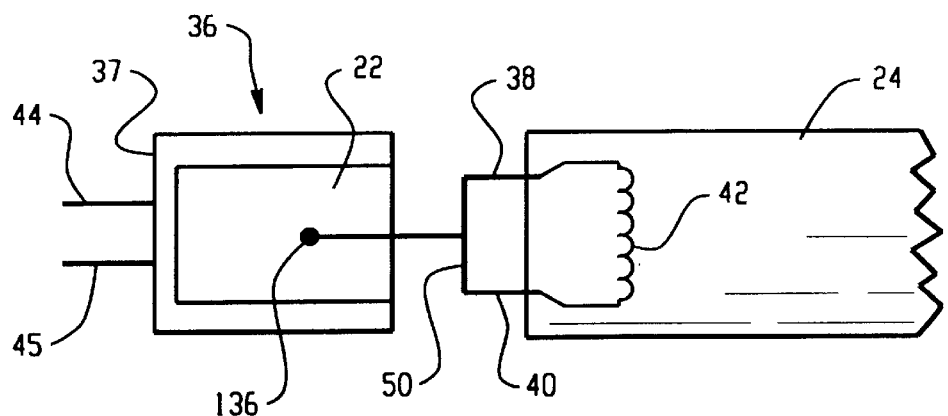
FIG. 3 depicts the integral connection relationship between the lamp electronics and lamp portion of the lamp/lamp electronics unit.

FIG. 3 illustrates the physical integration between lamp electronics 22 and lamp 24 which may be accomplished through various connection techniques. In FIG. 3, ends or terminals 38 and 40 of shorted filament 42, are connected to lamp electronics 22, for example, via connection point 136, internally in lamp electronics 22. The connection between the lamp electronics 22 and terminals 38, 40 may be accomplished through many known connection techniques including soldering, welding, wrapping, or a mechanical locking mechanism, among others. Pins 44 and 45 extend from an end surface of lamp electronics end cap 37.

Figure 4:
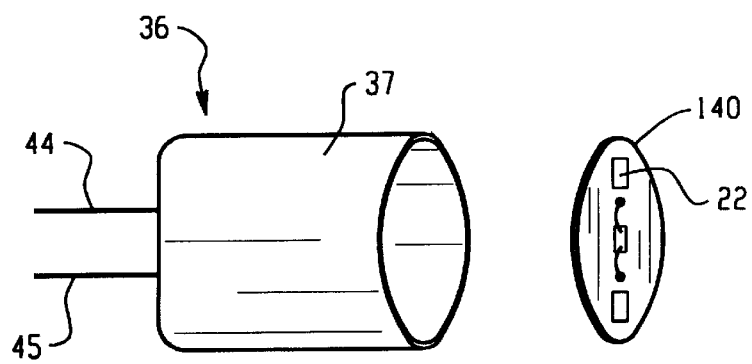
FIG. 4 illustrates the end cap end lamp electronics on carrier into relationship.

Turning to FIG. 4, in one embodiment, lamp electronics 22 may be configured on a circuit board or other carrier element 140 which may be a single-sided or double-sided circuit board. The circuit board configuration or dimensions may be substantially similar to the configuration of lamp electronics cap 37. The lamp electronics 22 carried on circuit board or other substrate 140 is inserted within cap 37, and connections from lamp 24 will be made to the surface of the circuit board 140 at the appropriate locations. Pins 44, 45 will also be appropriately connected to circuit board 140 such that appropriate connections with lines 52, 54 and 56 are made to lamp electronics 22. Therefore, lamp electronics end cap 37 is sufficiently sized to receive the circuit board 140 within its interior in a secure relationship. The circuit board itself may be fastened within lamp electronics end cap 37 using known processes and materials, such as using an adhesive, soldering or other known connection techniques. Lamp electronics end cap configuration 36, after appropriate connections have been made to circuit board 140, will then be integrated to lamp 24, again using known sealant and/or connection techniques. It is to be appreciated that the disclosed circuit board configuration is one embodiment of the present invention. Other configurations may also be used to incorporate lamp electronics 22 into lamp electronics end cap 37, whereby lamp/lamp electronics unit 12 is formed by integration of lamp electronics end cap configuration 36 and lamp 24.

Lamp electronics 22 is held within electronics end cap 37 in such a manner that the lamp electronics end cap configuration 36 is capable of withstanding the high temperature environment in which it is intended to function. Specifically, since lamp electronics end cap configuration 36 is integrated and therefore in very close physical position to lamp 24, lamp electronics 22 will be subject to significant amounts of temperature fluctuations. Therefore, the design of lamp electronics end cap configuration 36 permits proper functioning of lamp electronics 22 in such an environment. It is additionally beneficial that lamp/lamp electronics unit 12, including lamp electronics 22 of lamp electronics end cap 36, be able to withstand mechanical vibrations which will occur due to transportation of the unit 12, installation of the unit 12 and testing, etc.

The following figures and discussion focus on construction techniques and configurations for a secure, reliable electronics end cap configuration 36 including lamp electronics 22.

Figure 5:
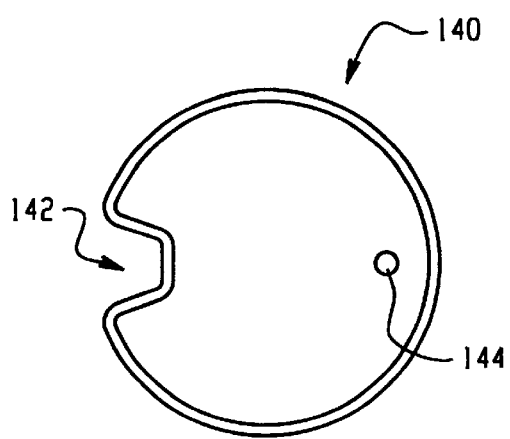
FIG. 5 is a front view of a carrier for lamp electronics, according to the concepts of the present invention.

Turning to FIG. 5, illustrated is a front view of circuit board 140 including a circuit board rib notch 142 and a circuit board relief hole or opening 144 located within the surface structure of circuit board 140 carrying lamp electronics 22.

Figure 6:
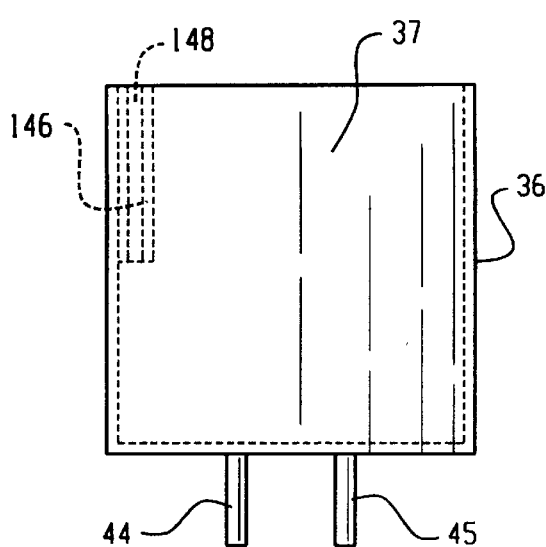
FIG. 6 is a side view of a lamp electronics end cap according to the present invention.

FIG. 6 shows that lamp electronics end cap 37 is configured with a cylindrical rib portion or structure 146 having located therein a dispensing hole or opening 148, where the rib portion 146 is located on an interior of the lamp electronics end cap 37. The lamp electronics end cap with rib portion can be formed by injection molding or other known manufacturing processes.

Figure 7:
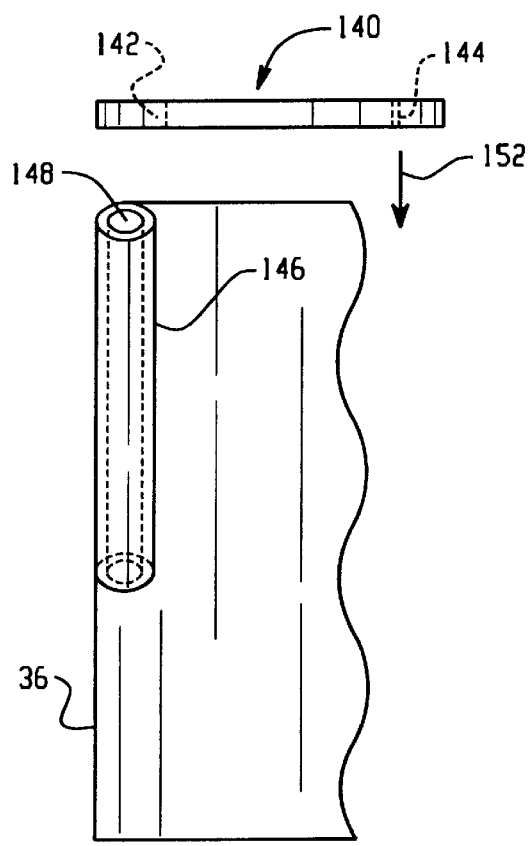
FIG. 7 is a more detailed view of the rib section of lamp electronic end cap of FIG. 6.

In an initial step, lamp electronics (in this embodiment carried on the circuit board 140) are inserted into the interior of lamp electronics end cap 37 such that circuit board rib notch 142 is aligned to fit around a section of rib portion 146. This concept is more clearly shown in FIG. 7. Circuit board 140, which is formed in substantially the same geometric design as lamp electronics end cap 37, is moved in the direction of arrow 152, into the interior of lamp electronics end cap 37. Rib notch 142 is located over rib portion 146, such that as circuit board 140 is moved downward, rib notch 142 engages the outer surface of rib portion 146.

It is noted the configuration of circuit board 140 assists in having the circuit board placed in a proper position within lamp electronics end cap 37. This polarization of circuit board 140 works to align the circuit board in a proper manner for further electrical connections.

Figure 8:
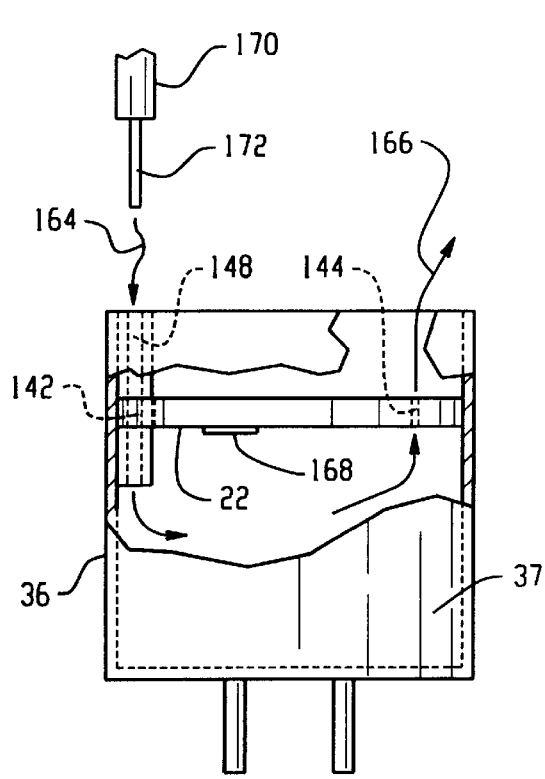
FIG. 8 depicts the lamp electronics on a carrier inserted within the lamp electronic end cap in accordance with the lamp electronics end cap configuration of the present invention.

Turning to FIG. 8, once circuit board 140 is properly positioned within the interior of lamp electronics end cap 37, a potting material 164 is supplied through the circuit board dispensing hole 148. The potting material acts to fill the interior. Air displaced by potting material 164, will exit as shown by arrow 166 via relief hole 144. In this design, the components of lamp electronics 22 are facing into interior. By this design, the lamp electronics 22 are properly potted in a secured fashion. An additional layer of potting material can also be applied to the back side or foil side 168 of the circuit board 140 to fully pot lamp electronics end cap 37.

While in this embodiment, circuit board 140 is shown as carrying electronics on a single side, the present invention can also be implemented using a double-sided circuit board which carries components on both of its sides. Potting material 164 may be deposited through dispensing hole 148 by a variety of designs. One includes a syringe type or other dispensing apparatus 170 as shown in FIG. 8. In this design, end portion 172 of apparatus 170 is aligned with or inserted into the dispensing hole 148 and potting material 164 is then moved through dispensing hole 148. In an alternative embodiment, the rib portion may not be used and the dispensing apparatus will be passed directly through notch 142. Also, relief hole 144 may be located at various locations on circuit board 140.

Figure 9:
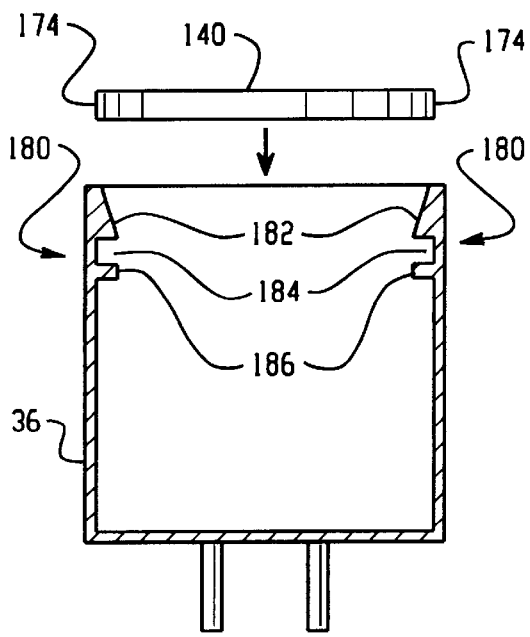
FIGS. 9 and 10 shows a lamp electronic end cap including holders for the lamp electronics carrier according to the present invention.
Figure 10:
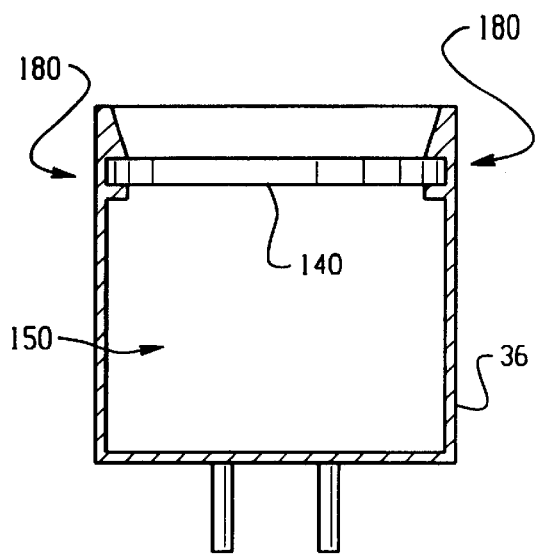

Turning to FIG. 9, lamp electronics end cap 37 may also be formed with holders 180 at multiple locations around the inner circumference of lamp electronics end cap 37. End cap 37 and holders 180 may be formed by injection molding or other known manufacturing process. As circuit board 140 is moved into interior of lamp electronics end cap 37, the outer edge 174 of circuit board 140 contacts tabs 182 of holders 180. As pressure is applied in a downward fashion, flexibility of lamp electronics end cap 37 and circuit board 140 allow further downward motion until edges of circuit board 140 snap into recesses 184. Further downward movement is restrained by stops 186. By this construction, circuit board 140, as shown in FIG. 10, is held securely within holders 180. Use of holders 180 may provide secure enough engagement of circuit board 140 such that potting of the interior is not needed. For more rigorous environments, the elements of circuit board 140 of FIG. 5 and lamp electronics end cap 37 of FIG. 6 may be integrated to provide for potting in addition to the holding feature.

Figure 11:
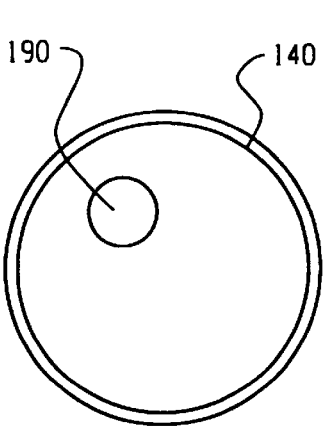
FIGS. 11 and 12 depict a carrier with an amp-in connector and the carrier located within and the electronics end cap.
Figure 12:
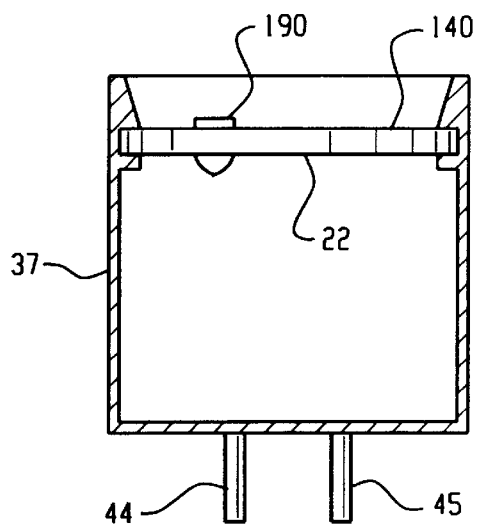

Turning to FIGS. 11 and 12, another feature of the present invention is illustrated. Particularly, circuit board 140 is designed with an amp-in connector 190 whereby connections or wiring, such as wire 50, from lamp 24 may be made to pins 44 and/or 45 of end cap 37. Amp-in connector 190 is located within circuit board 140 to allow wiring from lamp 24 to pass through the circuit board 140 which has been inserted within the interior of the end cap 37. It is noted that these connections would be made before any potting operation, if used, is undertaken. It is also noted that amp-in 190 is a unidirectional component, whereby while wires may pass through into the interior of lamp electronics end cap 37, an attempt to remove wires will cause amp-in 190 to grip and hold the wire's inhibiting removal.

Figure 13:
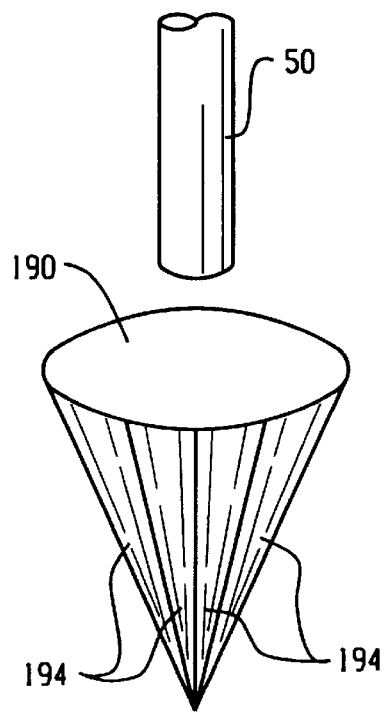
FIGS. 13, 14, and 15 illustrate the operation of the amp-in connector.
Figure 14:
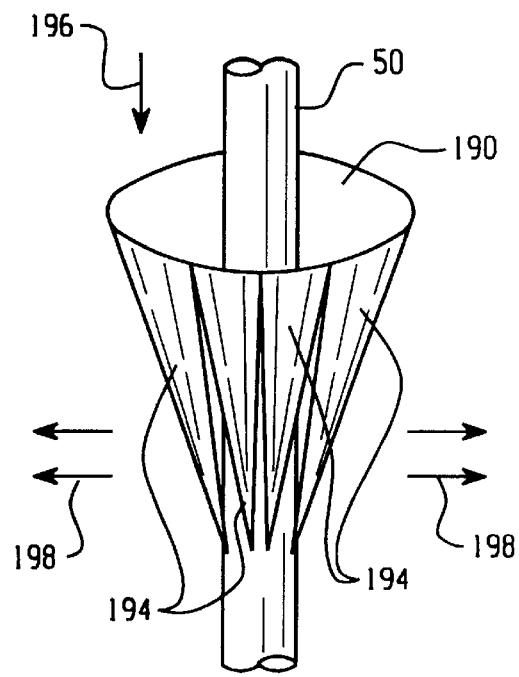
Figure 15:
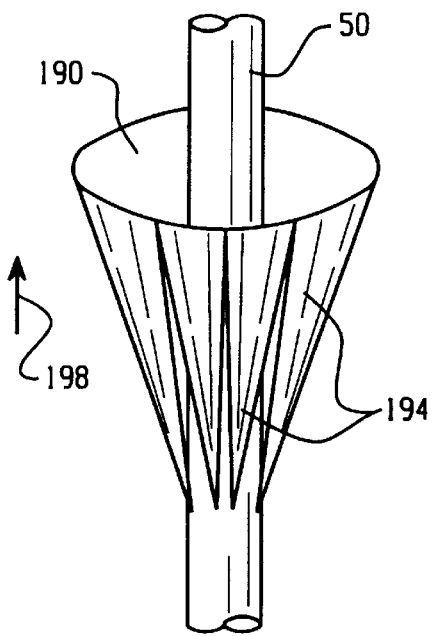

The operation of amp-in connector 190 may be seen more clearly in connection with FIGS. 13, 14 and 15. In FIG. 13, prior to wire 50 being moved through amp-in connector 190, spring elements 194 are in a closed position. As wire 50 is moved through the amp-in connector 190, as shown by arrow 196 in FIG. 14, pressure is applied to spring elements 194, causing them to move outward, as is shown by arrows 198. This action permits an opening in the bottom of amp-in connector 190 sufficient for the passage of wire 50. However, as illustrated in FIG. 15, when removal of wire 50 is attempted, as depicted by direction arrow 198, spring elements 194 located around wire 50 act to clamp and hold wire 50 within its position inhibiting removal. This unidirectional feature also inhibits potting material from undesirably seeping through the amp-in component 190 to the foil surface 168 of circuit board 140. It is to be appreciated that the amp-in component 190 is one of other known clamping and unidirectional wiring device which may be used in the present embodiment, all of which are well-known in the art.

Figure 16:
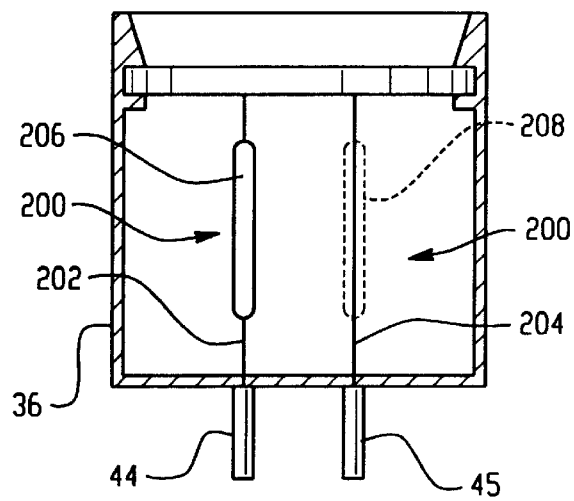
FIG. 16 shows a further lamp electronics end cap embodiment including a fusing element.

Turning to FIG. 16, another embodiment of the lamp electronics end cap configuration 36 is designed with a fusing element 200 to provide over-voltage protection to lamp/lamp electronics unit 12. Thus, wire 202 from pin 44 and wire 204 from pin 45 going to circuit board 140 may each or at least one have a fuse element 206, 208 included therein.

In lamp units which are interchangeable between sockets, whereby it is unknown which pin 44 or 45 will be a pin carrying power, both wires 202 and 204 may have a fusing element 200. Fusing element 200 would be of an appropriate value to ensure protection of unit 12. Pins 44 and 45 may be crimped to wires 202 and 204 or connected by some other well-known connection scheme. Again, these connections are made prior to any potting operation is undertaken.

When a failure occurs it is the unit 12 as a whole which needs to be replaced. Previously, in existing three or four lamp systems, when a failure would occur a lamp change alone would be made and if the system still did not work, then it would be necessary to replace the electronics. Lamp/lamp electronics unit 12 eliminates this uncertainty. It also eliminates the requirement of an electrician being called to replace the electronics, since no wiring changes need to be made. Rather, unit 12 is simply removed, and a new unit 12 is inserted.

In existing lamp systems, a linear fluorescent lamp will commonly have a life expectancy significantly different from the lamp electronics powering the lamp. Employing the present innovation, the life of the lamp electronics and life of the lamp are more closely matched.

Further, by providing the present lamp electronics with a specific individual lamp, the lamp electronics can be more finely tuned to the operational ranges of the specific lamp with which it is integrated. This situation allows for an improvement in efficiency of operation for the lamp electronics as it controls operation of the lamp.

A further aspect of the present invention is that lamp/lamp electronics unit 12 may be inserted into the lamp connectors 16, 18 in any fashion. More particularly, pins 44, 45 of lamp electronics end cap 37 may be inserted into either of lamp connectors 16, 18 as can pins 28, 29 of end cap 26. Thus it is not necessary to be concerned as to proper polarity of insertion of unit 12.

The present invention also does not require the use of a shutdown circuit for the removal of the lamp. Rather, as soon as the lamp/lamp electronics unit 12 is removed from the connections, power is removed from the circuit.

Returning attention to FIG. 2, it is noted that in this figure power source 20 is depicted as being internal to housing or fitting 14. It is understood that this is simply for sake of convenience and the actual power supply to such housings may be external such as from a home, commercial or office lighting system.

Exemplary component values for the circuit of FIG. 4 are as follows for a fluorescent lamp 24 rated at 16.5 watts, with a d.c. bus voltage of 160 volts:

| | |
|---|---|
| Smoothing capacitors (each) 60, 62 | 68 nF |
| Diodes 66–72 | 1N4005 |
| Resonant inductor 80 | 280 $\mu$H |
| Resonant capacitor 82 | 4.7 nF |
| Driving inductor 108 | 2.2 $\mu$H |
| Turns ratio between 80 and 108 | about 12 |
| Second inductor 110 | 820 $\mu$H |
| Zener diodes 114, 116 (each) | 10 volts, 1N5240 |
| Capacitor 118 | 1 nF |
| Capacitor 120 | 680 pF |
| Capacitor 122 | 2.2 nF |
| Resistors 124, 126 and 128, each | 130k ohm |
| Capacitor 138 | 22 nF |
| Zener Diode Clamp (each diode) 139 | 51 volts, 1N5262 |

Additionally, switch 74 may be an IRFR214, n-channel, enhancement mode MOSFET, sold by International Rectifier Company, of El Segundo, Calif.; and switch 76, an IRFR9214, P-channel, enhancement mode MOSFET also sold by International Rectifier Company.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A lamp electronics end cap configuration for use in an integral lamp, also including a lamp portion having a first end and a second end, the lamp electronics end cap configuration comprising:
   a lamp electronics end cap having an interior section and a set of pins extending from a surface of the lamp electronics end cap; and
   lamp electronics configured to control operation of the integral lamp, located within the interior of the lamp electronics end cap, wherein configuration of the lamp electronics requires neither an external or internal conductor to extend along the length of the lamp.

2. The lamp electronics end cap configuration according to claim 1, wherein the lamp electronics is carried on a carrier having dimension substantially similar to the lamp electronics end cap.

3. The lamp electronics end cap configuration according to claim 2, wherein the carrier includes a rib notch and a relief opening.

4. The lamp electronics end cap configuration according to claim 3, wherein the lamp electronics end cap includes a rib structure carried on an interior of the lamp electronics end cap, the rib structure including an interior dispensing opening extending the length of the rib structure.

5. The lamp electronics end cap configuration according to claim 4, wherein the rib notch of the carrier is positioned to engage an outer surface of the rib structure.

6. The lamp electronics end cap configuration according to claim 5, wherein when the carrier is positioned within the interior of the lamp electronics end cap, lamp electronics carried on the carrier face into the interior of the lamp electronics end cap.

7. The lamp electronics end cap configuration according to claim 6, wherein at least portion of the interior is filled with a potting material, the potting material received in the interior through the interior dispensing opening of the rib structure.

8. The lamp electronics end cap configuration according to claim 2, wherein the lamp electronics end cap includes holders selectively located around an interior circumference of the lamp electronics end cap, the holders designed to hold the carrier in a secure position.

9. The lamp electronics end cap configuration according to claim 8, wherein each of the holders include a tab, a recess, and a stop, wherein an outer edge of the carrier is designed to fit within the recess between the tab and stop.

10. The lamp electronics end cap configuration according to claim 2, wherein the carrier includes an amp-in connector.

11. The lamp electronics end cap configuration according to claim 2, further including at least one fuse connected from at least one pin of the lamp electronics end cap to the lamp electronics.

12. An integrated lamp/lamp electronics unit comprising:
   a lamp having a first end with first end terminals, and a second end with second end terminals;
   an end cap having an interior section, wherein the end cap is in electrical connection with the first end terminals at the first end of the lamp; and
   a lamp electronics end cap configuration including,
   a lamp electronics end cap having an interior section and a set of pins extending from a surface of the lamp electronics end cap, and
   lamp electronics configured to control operation of the lamp, the lamp electronics located within the interior of the lamp electronics end cap, wherein as between the first end terminals and the second end terminals, the lamp electronics are connected only to the second end terminals.

13. The lamp/lamp electronics unit according to claim 12 wherein the lamp electronics are carried on a carrier having a dimension substantially matching the second end of the lamp portion.

14. The lamp/lamp electronics unit according to claim 12 wherein connection between the lamp and the lamp electronics is by three node connections, a first node being used as a dedicated input, a second node being used as a dedicated output, and the third node being used as an input and output.

15. The lamp electronics end cap configuration according to claim 1, wherein neither an external or internal conductor wire extends along the length of the integral lamp from the lamp electronics to the distant end of the integral lamp.

16. The lamp/lamp electronics unit according to claim 12, wherein neither an external or internal conductor wire extends along the length of the lamp from the first end to the second end.

17. A lamp electronics end cap configuration for use in a lamp system, also including a lamp, the lamp electronics end cap configuration comprising:

a lamp electronics end cap having an interior section and a set of pins extending from a surface of the lamp electronics end cap; and lamp electronics configured to control operation of the lamp, the lamp electronics located within the interior of the lamp electronics end cap, wherein direct physical connection between the lamp electronics and lamp is at a single end of the lamp.

18. The lamp electronics end cap configuration according to claim 17, wherein the lamp electronics is carried on a carrier having dimension substantially similar to the lamp electronics end cap, and wherein the carrier includes a rib notch and a relief opening.

19. The lamp electronics end cap configuration according to claim 18, wherein the lamp electronics end cap includes a rib structure carried on an interior of the lamp electronics end cap, the rib structure including an interior dispensing opening extending the length of the rib structure.

20. The lamp electronics end cap configuration according to claim 18, wherein the lamp electronics end cap includes holders selectively located around an interior circumference of the lamp electronics end cap, the holders designed to hold the carrier in a secure position.

* * * * *